United States Patent

MacDonald et al.

[15] 3,698,183
[45] Oct. 17, 1972

[54] INITIATOR BOOSTER

[72] Inventors: Hugh D. MacDonald, Cinnaminson, N.J.; Eugene J. Doebley, Philadelphia, Pa.

[73] Assignee: The United States of America as represented by the Secretary of the Army

[22] Filed: June 1, 1971

[21] Appl. No.: 148,563

[52] U.S. Cl. ............... 60/26.1, 102/27 R, 244/122 R
[51] Int. Cl. ......................... F01b 31/00, F01b 9/100
[58] Field of Search ....... 60/26.1, 39.28 E; 102/27 R; 89/1 R, 1.5 R; 244/122 R, 122 AE, 122 AF, 122 AG

[56] References Cited

UNITED STATES PATENTS

| | | | |
|---|---|---|---|
| 2,527,020 | 10/1950 | Martin | 60/26.1 X |
| 2,820,602 | 1/1958 | Foster | 244/122 AE |
| 3,320,884 | 5/1967 | Kowalick et al. | 102/27 R |
| 3,326,127 | 6/1967 | Schimmel | 102/27 R |
| 3,343,487 | 9/1967 | Hare, Jr. et al. | 102/27 R |
| 3,417,947 | 12/1968 | Valentine | 244/122 R |
| 3,597,919 | 8/1971 | Lily | 60/26.1 |
| 3,618,521 | 11/1971 | Montesi | 102/27 R |

FOREIGN PATENTS OR APPLICATIONS

| | | | |
|---|---|---|---|
| 638,974 | 6/1950 | Great Britain | 102/27 R |

*Primary Examiner*—Wendell E. Burns
*Attorney*—Harry M. Saragovitz, Edward J. Kelly, Herbert Berl and William Sommer

[57] ABSTRACT

A miniature initiator booster for an energy transmission system having a minimum of size, weight and production cost. It includes a unitary body with a longitudinal passage defined by an internal cylindrical wall at the body ends and an intermediate enlarged annulus substantially filled with propellant pellets that surround predetermined small apertures in the sidewall of a hot gas transmitting flash tube. The central portion of the flash tube is blocked with an integral transverse wall to direct the inlet hot gas into the propellant containing annulus for ignition of the booster propellant and release of the booster gas through the sidewall apertures in a manner to satisfy the system requirements.

2 Claims, 1 Drawing Figure

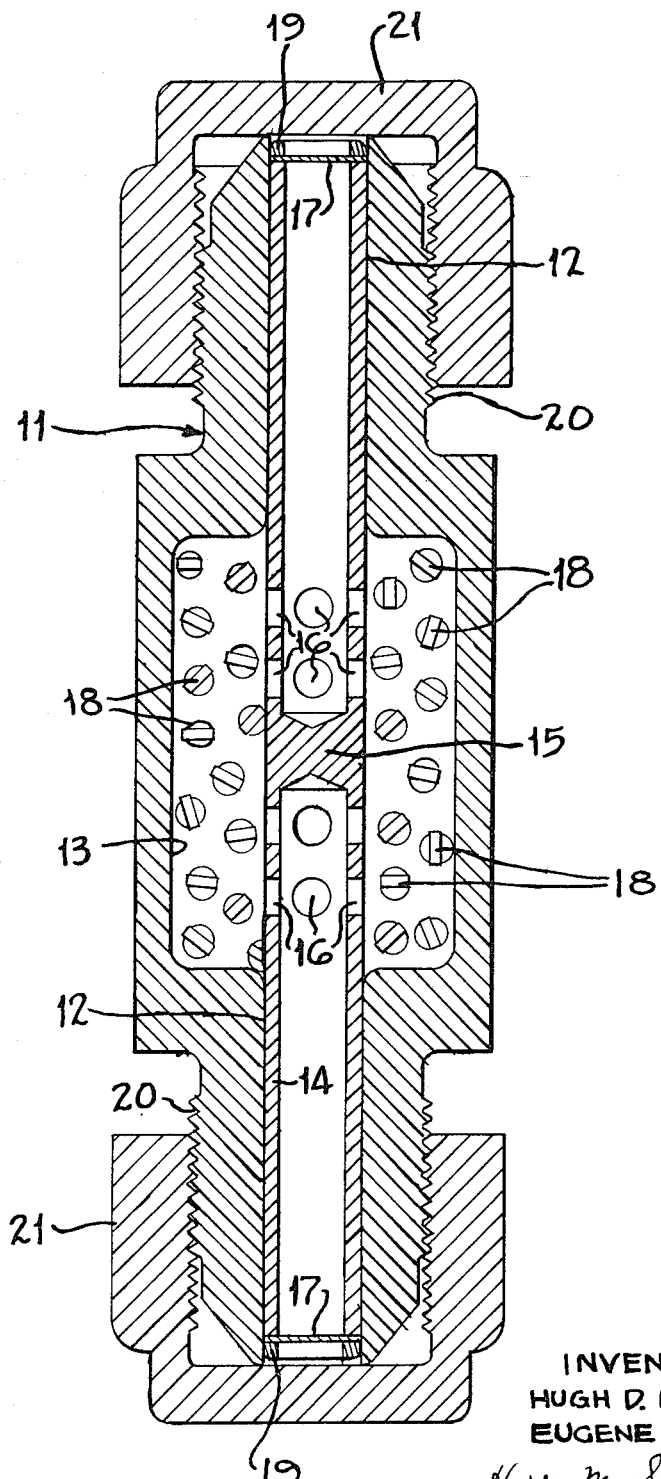

INITIATOR BOOSTER

The invention described herein maybe manufactured, used, and licensed by or for the Government for governmental purposes without the payment to us of any royalty thereon.

This invention is related to initiators, and more particularly, to a miniature initiator booster for an energy transmission system.

In aircraft ballistic transmission systems, initiating signals are transmitted from gas sources or initiators through flexible hose lines or steel tubing to other initiators used for timing and sequencing other functional devices such as canopy remover, leg positioning thrusters, canopy unlock thrusters, rocket catapults, seat-man separators, automatic restraint releases and parachute deployment devices. The initiators are generally carried as dead weight in an aircraft for escape of personnel during a one time emergency.

It is an object of the invention to provide an improved miniature initiator booster with a minimum of weight, size and cost.

Another object of the invention is to provide such an initiator that multiple use thereof will reduce by meaningful amounts the dead weight and volume carried by an aircraft for the initiating portion of the emergency escape system.

A further object of the invention is to provide such an initiator that is reversibly adapted, and thus more easily manufactured and less prone to erroneous assembly.

These and other objects, features and advantages will become more apparent from the following description and accompanying drawing in which the sole FIGURE is a longitudinal sectional view of a miniature initiator embodying the principles of the invention.

The unitary body or housing 11 of the miniature initiator booster has a longitudinal passage or through bore as defined by the internal cylindrical wall 12. Intermediate the end portions of the body wall 12, there is provided an enlarged annulus 13 preferably formed at the central portion of the body.

A flash tube 14, substantially the same length as the body, is friction fitted in the passage 12. The open ends of the tube 14 are blocked from each other by an integral transverse wall 15 that extends across a midlength portion of the tube centrally of the annulus 13 to divide the tube interior into separate fluid compartments. A plurality of apertures 16 are provided in the tube sidewall on both sides of and adjacent the transverse wall 15. The annulus 13 is substantially fitted, in a manner to be described, with propellant pellets 18 that are larger than the size of the openings or apertures 16.

In assembly the tube is positioned with either end withdrawn to the extent that propellant pellets can be poured and pass into the annulus 13 when a suitable rod (not shown) is temporarily placed in the respective tube open end.

With the annulus filled with propellant pellets, the tube 14 is moved to its desired position in the passage, each end of which then is provided with a sealing disc 17 and ring 19 assembled with a light coating of structural adhesive.

Identical external threads 20, 20 are provided on the ends of the body 11, such that either end can be connected to desired components of an energy transmission system. A pair of end caps 21, 21 can be secured to the initiator ends prior to packaging, storage, etc.

Operationally, with the sealing members removed prior to installation, hot gas can be delivered from a ballistic source to one of the flash tube ends for passage through the respective openings 16 to ignite the booster propellant pellets 18. Generated booster pressure gas is delivered through tube apertures 16 to the separate compartments for controlled use as the requirements of the system demand.

We wish it be be understood that we do not desire to be limited to the exact details of construction shown and described, for obvious modifications will occur to a person skilled in the art.

We claim:

1. A miniature initiator booster for an energy transmission system comprising,
    a unitary body having a longitudinal passage therethrough defined by an internal cylindrical wall at end portions of said body, and an enlarged annulus intermediate said cylindrical end wall portions,
    a flash tube friction fitted in said end wall portions and having an integral transverse wall extending across said tube substantially mid-length said enlarged annulus and dividing the tube interior into separate fluid compartments, a plurality of apertures in the sidewall of said tube on both sides of and adjacent said transverse wall, and
    propellant pellets larger than said apertures substantially filling said enlarged annulus and in fluid communication with all of said apertures.

2. The structure of claim 1 wherein identical external threads are provided on each of said body end portions.

\* \* \* \* \*